Nov. 21, 1950

J. A. RONNING 2,530,733

MOWING MACHINE

Filed May 24, 1948

Inventor
Jacob A. Ronning
By Attorneys
Merchant & Merchant

Nov. 21, 1950 — J. A. RONNING — 2,530,733
MOWING MACHINE
Filed May 24, 1948 — 4 Sheets-Sheet 2
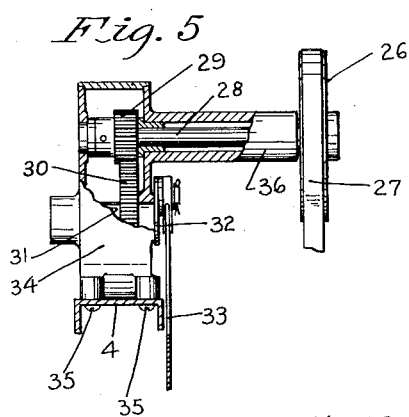
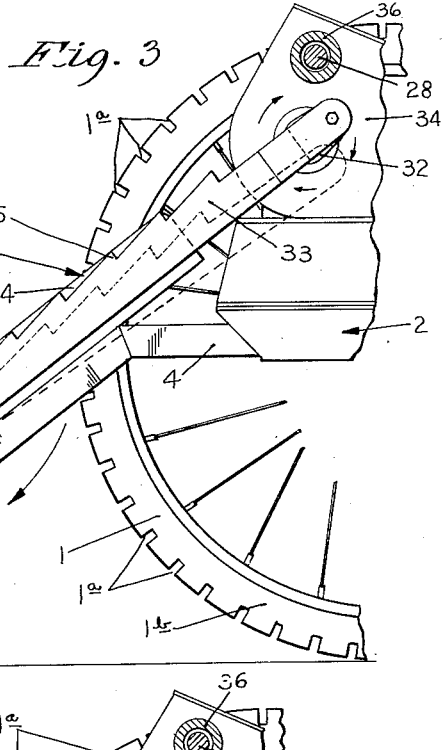
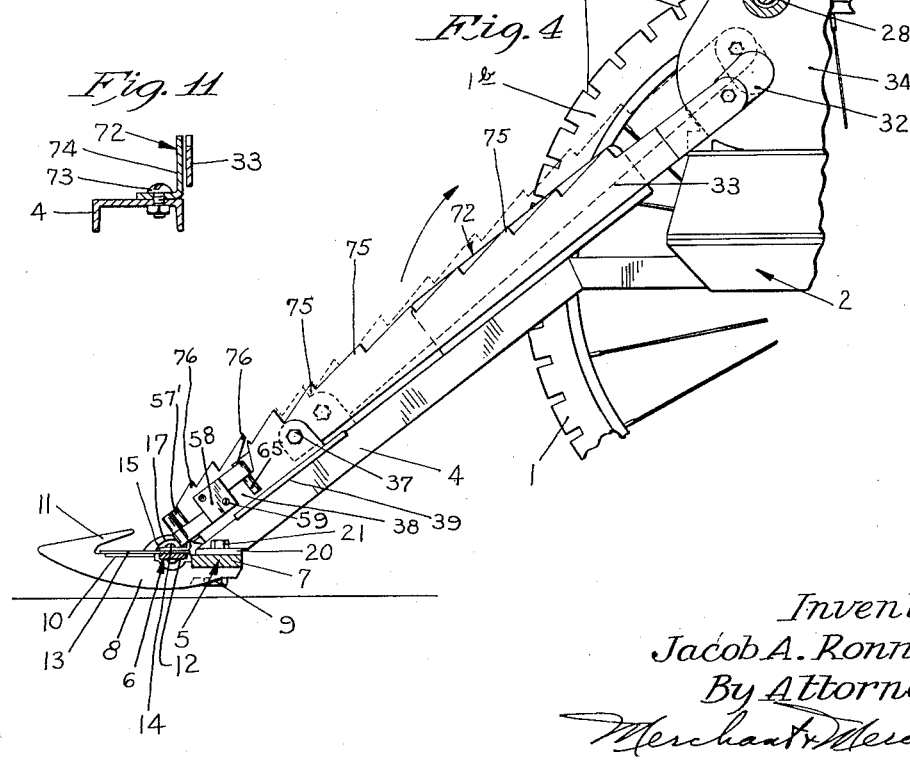
Inventor
Jacob A. Ronning
By Attorneys
Merchant & Merchant Nov. 21, 1950     J. A. RONNING     2,530,733
MOWING MACHINE
Filed May 24, 1948     4 Sheets-Sheet 3
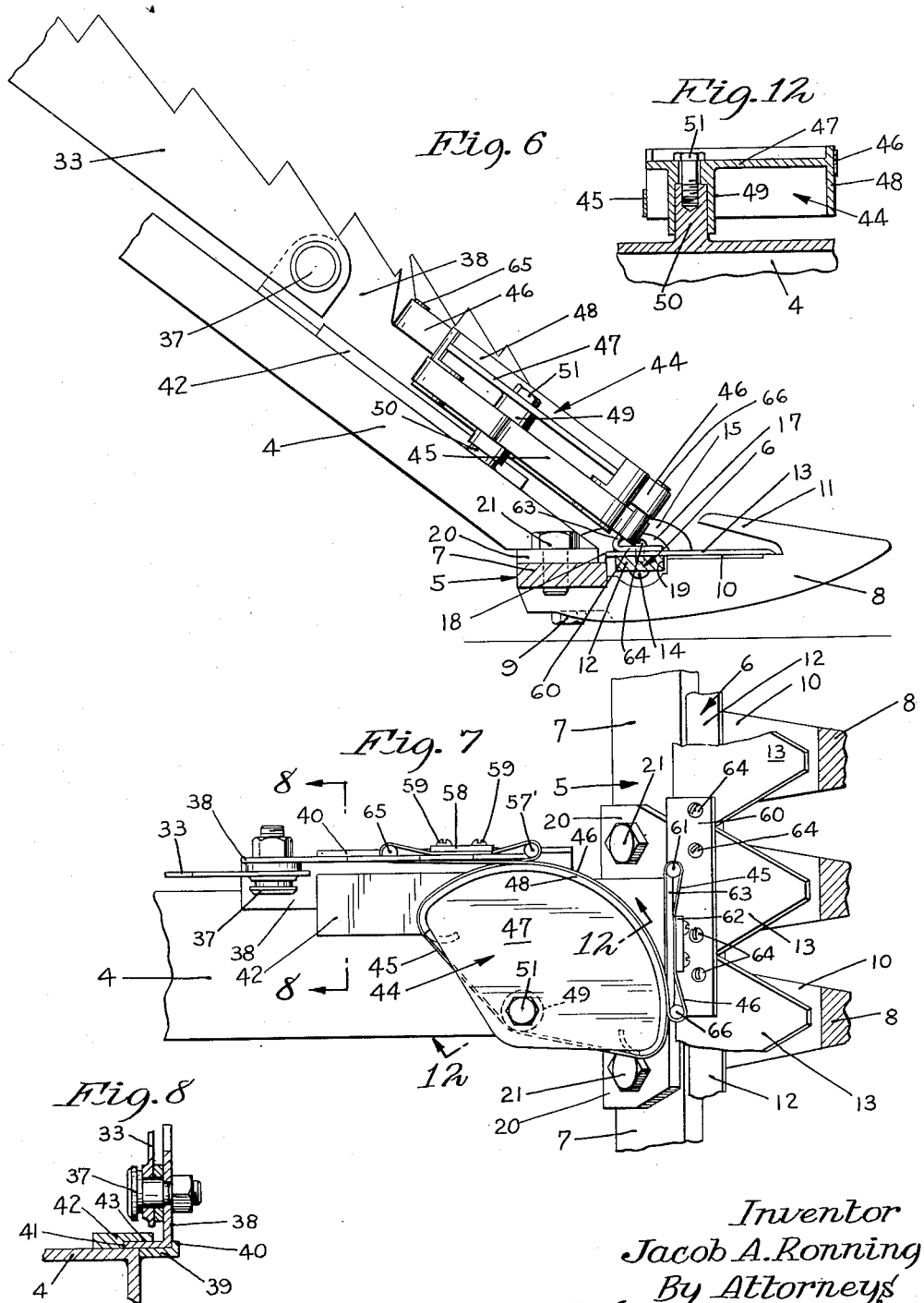
Inventor
Jacob A. Ronning
By Attorneys
Merchant & Merchant Nov. 21, 1950     J. A. RONNING     2,530,733
MOWING MACHINE
Filed May 24, 1948     4 Sheets-Sheet 4
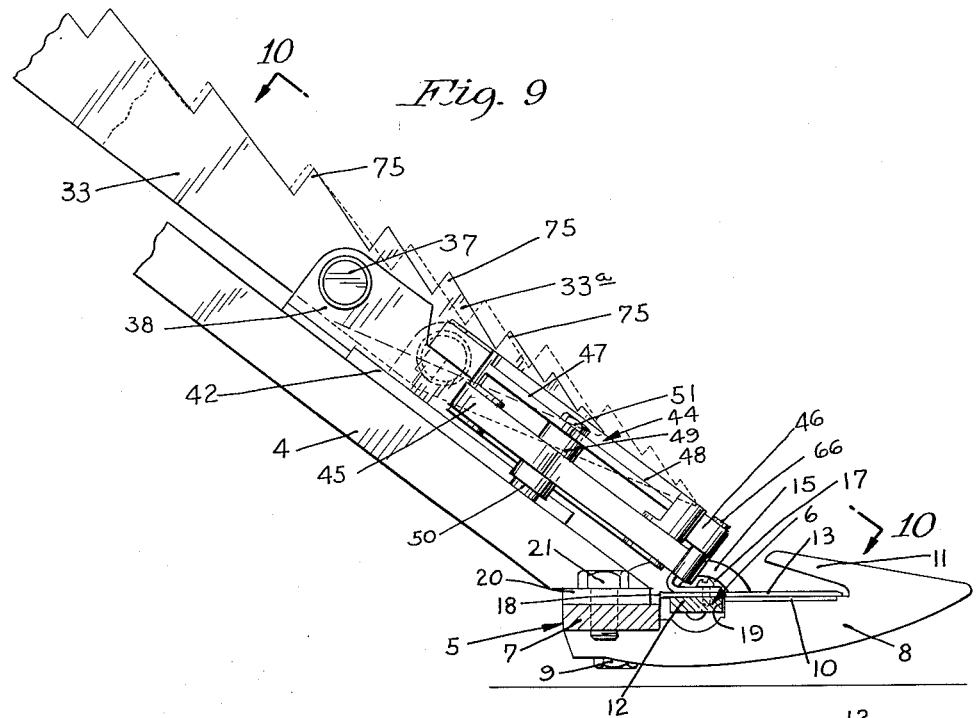
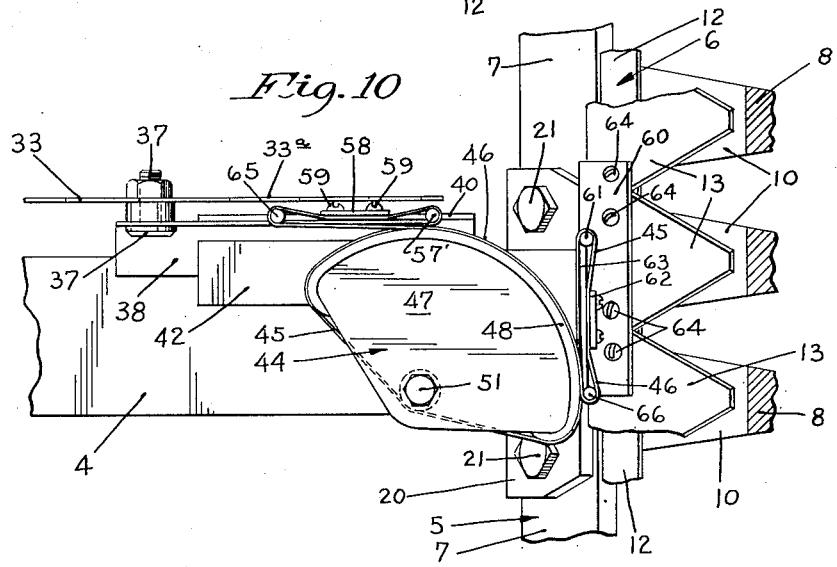
Inventor
Jacob A. Ronning
By Attorneys
Merchant & Merchant Patented Nov. 21, 1950

2,530,733

UNITED STATES PATENT OFFICE 2,530,733

MOWING MACHINE

Jacob A. Ronning, Minneapolis, Minn.

Application May 24, 1948, Serial No. 28,790

12 Claims. (Cl. 56—26.5)

My present invention relates to improvements in mowing machines, and more particularly to mowers of the kind employing cooperating relatively reciprocating toothed cutting bars and which type is often referred to as sickle bar mowers.

In a still more specific sense, my invention relates to improvements in mowing machines of the general character indicated wherein the cutting mechanism is located in the front of the machine with other units of the machine located directly behind and following the cutting mechanism. With machines of this kind, there is a great tendency for cuttings to accumulate on, become entangled with, and be dragged along by portions of the machine following behind the cutting mechanism, and this invention has for its main object the elimination of this objectionable characteristic of machines of this type. To this end, and as an important objective of this invention, I provide a simple, inexpensive and very durable means and mechanism for automatically dividing the cuttings, which are often matted together, so as to permit free and unobstructed passage thereby of those portions of the machine following the cutting mechanism.

A still further objective of the invention is the utilization of otherwise essential elements of the machine for the purpose of automatically engaging and dividing the cuttings following the cutting mechanism and to permit free passage of parts of the machine following the cutting mechanism and about which undivided cuttings would otherwise tend to be hung up, accumulated, and dragged along.

The above and numerous other important objects and advantages of the invention will be made apparent from the following specification, claims, and appended drawings.

Referring to the drawings:

Fig. 3 is an enlarged fragmentary sectional view, taken on the line 3—3 of Fig. 2;

Fig. 4 is a fragmentary view corresponding to Fig. 3, but showing a somewhat different position of certain of the parts;

Fig. 5 is an enlarged fragmentary view in front elevation taken on the line 5—5 of Fig. 3, with some parts broken away and some parts sectioned;

Fig. 6 is an enlarged fragmentary sectional view taken on the line 6—6 of Fig. 2;

Fig. 7 is an enlarged fragmentary view in elevation taken on the line 7—7 of Fig. 1;

Fig. 8 is a detail sectional view taken on the line 8—8 of Fig. 7;

Fig. 9 is a view corresponding to Fig. 6, but showing a slightly modified form of the invention;

Fig. 10 is a fragmentary view in elevation taken on the line 10—10 of Fig. 9;

Fig. 11 is an enlarged detail sectional view taken on the line 11—11 of Fig. 2; and Fig. 12 is a detail sectional view taken on the line 12—12 of Fig. 7.

Figure 1:
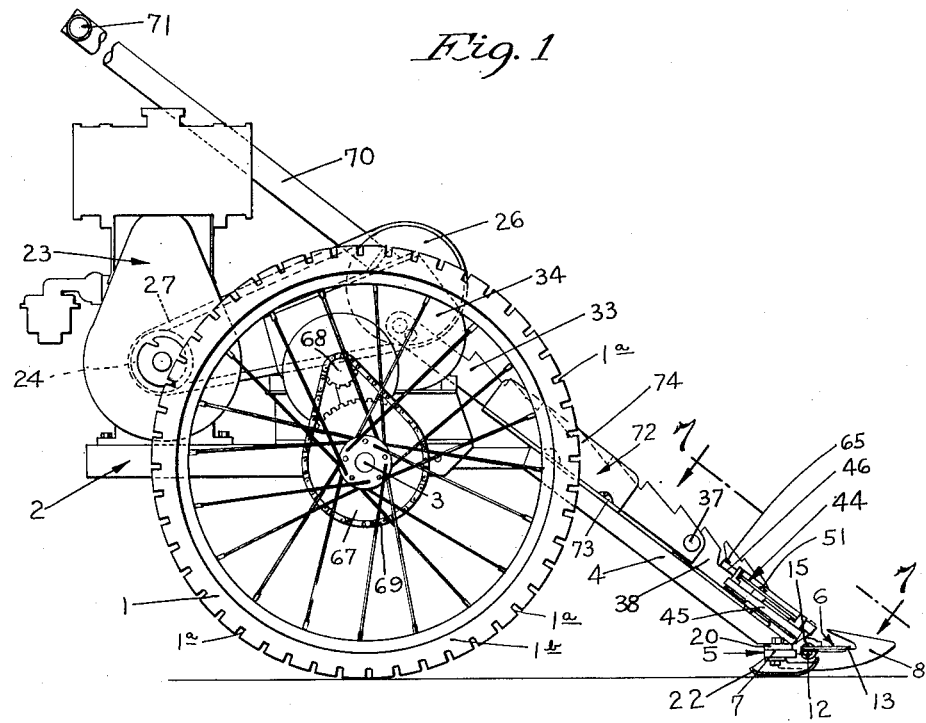
Fig. 1 is a view in side elevation of a machine embodying the instant invention.

Referring with greater particularity to the drawings, a pair of laterally spaced ground wheels are indicated by 1 and the frame of the machine is indicated as an entirety by 2. The frame 2 is mounted fast on opposite ends of an axle 3, and the frame 2 is suitably journalled upon the axle 3. The frame 2 is provided with a forwardly and downwardly projecting tongue-like portion 4 located in the vicinity of the transverse center of the machine.

The reciprocating type cutting mechanism of the machine is mounted on the outer end of the frame tongue 4 and comprises cooperating relatively reciprocatory toothed cutting bars indicated as entireties by 5 and 6, respectively. In the preferred embodiment of the invention illustrated, the cutting bar 5 takes the form of a more or less conventional finger bar and is mounted fast on the end of the frame tongue 4, and the toothed cutting bar 6 overlies and is mounted for linear reciprocation on the finger bar 5 and takes the form of a more or less conventional sickle bar or knife head. The so-called finger bar 5 is a composite structure comprising a rigid beam 7 equipped with fingers or teeth 8 at uniformly spaced points lengthwise thereof and detachably secured fast thereon by head-equipped screws 9. The cutting surfaces of the fingers or teeth 8 are formed by hardened steel insets 10, according to conventional practice. Also, in accordance with conventional practice, the fingers or teeth 8 are shown as provided with upwardly and rearwardly projecting guard portions 11. As shown, the reciprocatory toothed sickle bar is also a composite structure and involves a beam portion 12 carrying a multiplicity of cutting blades or teeth 13 secured thereto by rivets or the like 14 and projecting over and working in face to face contact with the upper surfaces of the elements 10 of the fingers 8.

The toothed sickle bar 6 comprising beam 12 and teeth or cutting blades 13 is retained against upward and rearward shifting movements with respect to the underlying finger bar 5 by retaining or guiding clips 15 of conventional form. These clips 15 are secured fast to the upper surface of the beam 7 of the finger bar 5 by rivets or the like 16, and project over and work against the upper faces of the blades or teeth 13 of the sickle bar 6. These clips 15 are applied at spaced points along the finger bar 5 and are recessed at 17 to receive the heads of rivets 14.

The free end of the frame tongue 4 is provided with a mounting flange 20 which overlies the beam 7 of the finger bar 5 and is anchored rigidly thereto by cap screws or the like 21. The point of connection of the frame tongue 4 to the beam 7 of the finger bar 5 is substantially at the longitudinal center thereof, and said finger bar 5 and the sickle bar 6 are at right angles to the tongue 4 and extend outwardly well beyond the vertical planes of the outer surfaces of the wheels 1.

Figure 2:
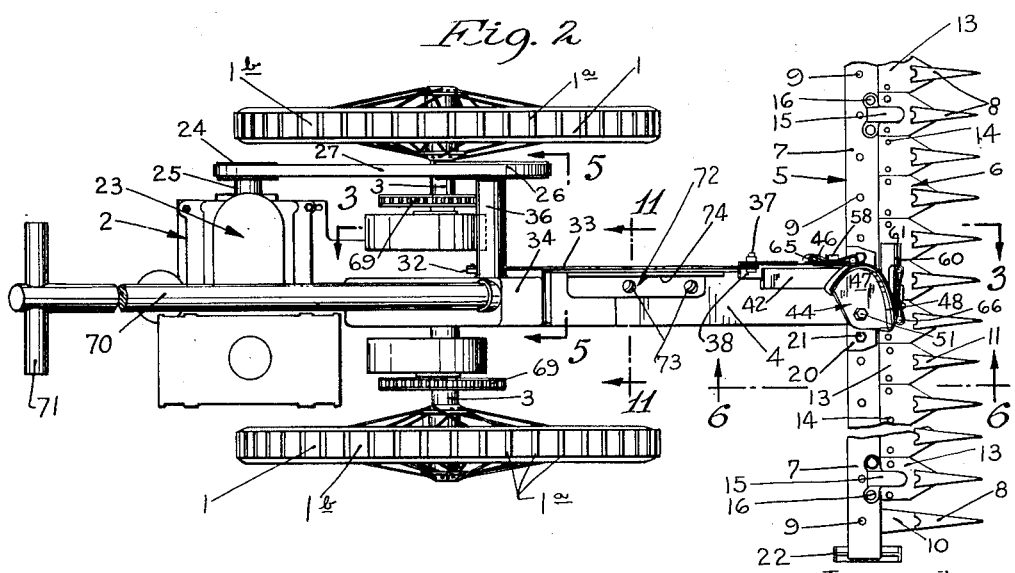
Fig. 2 is a plan view, with some parts broken away, of the machine of Fig. 1.

By reference particularly to Figs. 1 and 2, it will be seen that the finger bar 5 is provided at its extreme outer ends with runner-like ground engaging shoes 22, which are bolted or otherwise rigidly secured to the beams 7 of the finger bar 5 and serve to maintain the cutting surfaces of the bars 5 and 6 in suitably spaced relation to ground level.

By reference particularly to Fig. 9, it will be seen that the flat rear ends of the teeth-acting knives 13 work against shoulders 18 of the clips 15 and that the smooth front edge of the beam 12 works against shoulders 19 of the fingers 8. Hence, it will be seen that the sickle bar, as an entirety, is guided for true straight line reciprocating motion over the cooperating finger bar 5.

The toothed sickle bar 6 is driven from a suitable source of power, which, as illustrated, is in the nature of an internal combustion engine 23 mounted on the frame 2 rearwardly of the axle 3, through power transmission mechanism comprising a V-groove pulley 24 on the engine shaft 25, a speed-reducing V-groove pulley 26, a V-belt 27 running over pulleys 24 and 26, a shaft 28 on the outer end of which the pulley 26 is mounted for common rotation, a spur pinion gear 29 fast on shaft 28, a speed-reducing gear 30 mounted fast on shaft 31, a crank 32 mounted fast on one end of shaft 31, and a forwardly and rearwardly extending elongated rigid motion transmitting member in the nature of a pitman arm 33. The gears 29 and 30 are contained within a gear box 34 that is mounted on the rear portion of the tongue 4 of frame 2 by screws or the like 35 (see particularly Fig. 6). The shaft 31 is journalled in suitable bearings in the sides of the gear box 34 and the shaft 28 is similarly journalled in the sides of the gear box 34 and in a long bearing sleeve 36 integrally formed with the gear box 34. The pitman arm 33 is disposed substantially at a right angle to the toothed cutting bars 5 and 6 and is operatively coupled to the bar 6 through motion direction changing mechanism described in the following paragraph.

The front end of the pitman arm 33 is pivoted at 37 to a slide 38 which is L-shaped in cross-section (see particularly Fig. 8), and is mounted for forward and rearward reciprocating movements on the frame tongue 4. The bottom of the L-shaped slide 38 works partly over the upper flat surface of the tongue 4 and partly over a shelf-like supporting ledge 39 welded or otherwise rigidly secured to the tongue 4 and having its upper surface in a plane common to that of the upper surface of the tongue 4. The laterally outer edge of the shelf-like ledge 39 is upturned to provide a guide flange 40 for the slide 38. The slide 38 is held against lateral shifting movements in one direction by the flange 40, and in the opposite direction by a shoulder 41 of a guide member 42 welded or otherwise rigidly secured to the upper surface of the frame tongue 4, and which has a tongue portion 43 working over the upper surface of the bottom flange of the L-shaped slide 38 to retain the same against upward displacement. As will be seen, the slide 38 is located in rather closely rearwardly spaced relation to the cutting bars 5 and 6 and is guided for reciprocation in a straight line angular to the lengths of and direction of relative reciprocation of the bars 5 and 6. As herein illustrated, the power transmission mechanism between the pitman arm 33 and the reciprocatory sickle bar or cutting bar 6 comprises the slide 38, an oscillatory pulley-acting member 44 pivoted on the frame tongue 4, and a pair of flexible power transmission members 45 and 46, respectively. As illustrated, the oscillatory member 44 is in the nature of a wheel segment comprising a flange 47 having an arcuate segmental rim portion 48, the flange 47 being formed with a tubular hub 49 that is journalled on a stub shaft 50 and is retained in position by a headed screw 51. The axis of the oscillatory member 44 is concentric with the axis of the generally arcuate face of the rim portion 48. The stub shaft 50 projects from the upper face of the tongue 4 and is rigid therewith. The flexible members 45 and 46 extend in opposite directions about the oscillatory member 44 and work over the generally arcuate face of the segmental rim portion 48. Corresponding end portions of the flexible members 45 and 46 are anchored to the slide 38 at spaced points lengthwise of the direction of reciprocation thereof, and the opposite corresponding ends of the flexible members 45 and 46 are anchored to the sickle bar 6 at points spaced lengthwise thereof.

In the forms of the invention illustrated herein, the flexible members 45 and 46 are in the nature of thin, flat ribbon-like bands of spring metal having suitable flexing qualities and tensile strength—spring bronze having been found particularly suitable for the purpose. The flexible band 45 is anchored to the upstanding flange of the elongated slide 38 by means of an anchoring post 57', clamping plate 58, and clamping screws 59. The flexible band 45 extends from the anchoring post 57' in a counterclockwise direction about the oscillatory member 44, spanning the space between the ends of the segmental flange 48 on the inside of the flange, and is anchored to the sickle bar 6 through the medium of an anchoring plate 60, an upstanding anchoring post 61 rigid with the plate 60, and a clamping plate 62 having screw threaded engagement with an upstanding flange 63 of the plate 60. The anchoring plate 60 is anchored to the upper surface of the reciprocatory sickle bar 6 by means of clamping screws or the like 64, and the anchoring post 61 is welded or otherwise rigidly secured to one end of the flange 63. One end of the flexible member or band 46 is anchored to the slide 38 through the medium of an anchoring post 65 corresponding to the anchoring post 57' and the clamping screw-equipped plate 58, and extends in a clockwise direction about the segmental flange 48 of member 44 from the anchoring post 65 and is anchored at its other end to an anchoring post 66 rigid with the plate 60 and corresponding to the anchoring post 61.

The motion direction changing transmission mechanism between the front end of the pitman arm 33 and the reciprocating sickle bar 6 may take different forms.

In the machine from which the drawings hereof were made, suitable transmission mechanism was provided for driving the ground wheels 1 from the engine 23, but since this portion of the machine is outside the scope of the present invention, no attempt has been made to completely illustrate the wheel driving mechanism. This wheel driving mechanism does, however, comprise chain sprockets 67, sprockets 68, link chains 69 running over the sprockets 67 and 68, and other elements not illustrated in sufficient detail to justify designation by numeral. Insofar as the instant invention is concerned, it makes no difference whether the machine be advanced manually or by mechanical means. As illustrated, the machine is of the two-wheel variety adapted for guidance by a walking operator; and for which purpose it is provided with a rearwardly and upwardly extending handle bar 70 equipped at its outer end with a handle 71. The handle bar 70 is anchored fast to the frame 2 through the medium of the gear box 34 to which the front end portion of the handle bar is rigidly anchored.

By reference to the drawings, it will be seen that both ends of the flexible band members 45 and 46 are tangential to the outer arcuate face of the segmental rim 48 of member 44 and that said flexible band members extend parallel to the sickle bar 6 and the line of reciprocation thereof from the arcuate face of rim portion 48 to their respective anchoring posts 66 or 61, and that said band members 45 and 46 extend parallel to the slide 38 and the line of reciprocation thereof from the arcuate face of flange 48 to their respective anchoring posts 57' or 65. In the construction described, the anchoring posts 61 and 66 serve as the fixed spaced points of anchorage of corresponding ends of the flexible band members 45 and 46 to the sickle bar, and the spaced anchoring posts 57' and 65, respectively, provide fixed spaced points of anchorage of the other corresponding ends of the flexible band members 45 and 46, respectively, to the slide member 38.

All of the elements, features and characteristics described above are common to all embodiments of the invention as illustrated in the accompanying drawings, Figs. 1 to 12, inclusive. However, there are two embodiments of the instant invention illustrated in the accompanying drawings and these, although having a great deal in common, will, nevertheless, be independently described below.

Referring, first, to the embodiment of the invention shown in Figs. 1 to 8, inclusive, and 12, it will be noted that the pitman arm 33, which is sometimes herein referred to as a rigid member or an elongated rigid member, is pivotally connected to the slide 38 adjacent its extreme front end at 37 and extends generally parallel to and works in closely spaced relation to the forwardly projecting frame tongue 4. Preferably, and as illustrated, the frame tongue 4 and pitman arm 33 are located closely intermediate the vertical planes of the insides of the ground wheels 1 and, as illustrated, the said frame tongue 4 and pitman arm 33 are located closely adjacent the transverse center of the machine. It is also important to note that in the embodiments of the invention illustrated, the frame tongue 4 is connected to the longitudinally intermediate portion of the finger bar 5 of the cutting mechanism and at a place closely adjacent the longitudinal center thereof, and that the cutting bars 5 and 6 extend laterally outwardly of the vertical planes of the outsides of the ground wheels 1. It is also important to note in connection with Figs. 1 to 8, inclusive, and 12, that the frame tongue 4 and pitman arm 33 are inclined from their front ends adjacent the cutting mechanism toward their rear ends and to points rearwardly of the vertical planes of the front portions of the wheels 1.

As an important feature of the instant invention, the upper surface of the reciprocating member or pitman arm 33 projects above that portion of the frame tongue 4 projecting forwardly of the wheels 1 and, in fact, all laterally adjacent frame carried portions or elements, during at least part of each operating cycle, so that the said upper surface of the reciprocating pitman arm 33 will be exposed to the under surface of cuttings during at least part of each operating cycle. In this connection, it is also important to note that the entire portion of the frame structure forwardly of the wheels is laterally inwardly spaced from the vertical planes of the insides of the ground wheels 1. With the machine illustrated, the cutting mechanism will cut a swathe or path of greater width than that of the machine, as measured between the outsides of the ground wheels 1, and matted cuttings and the like will work over the upper surface of the reciprocating pitman arm 33 and frame tongue 4 under advancement of the machine, and the reciprocating motion of the pitman arm 33 on the cuttings will tend to part the same at the transverse center of the machine during their passage over the upper surface of the reciprocating pitman arm 33 and the upper surface of the slide 38. In the present machine, this parting action of the reciprocating member or pitman arm 33 on the cuttings is materially aided by the ground wheels 1 which, under advancement of the machine, engage, drag down, and anchor matted cuttings and the like overlying the reciprocating pitman arm or member 33. In the preferred arrangements llustrated, the frame tongue 4 is provided with a portion or member 72 which works in closely laterally spaced relation to one side of the reciprocating pitman arm 33. In practice, this could be an integral part of the tongue 4, but, as illustrated, this member 72 is in the nature of an elongated angle iron having its horizontal bottom flange anchored to the upper surface of the frame tongue 4 by screws or the like 73 and having its upstanding vertical flange 74 working in laterally spaced parallel relation to one side of the pitman arm 33. The flange 74 is elongated and extends from a point rearwardly of the vertical plane of the front of the ground wheels 1 to a point considerably forwardly of said plane. The upper edge of the flange 74 is disposed in the plane of the upper surface of the reciprocating pitman arm 33 when the pitman-operating crank 32 is on either of its dead center positions shown in Figs. 3 and 4, respectively, so that the pitman arm will rise above the plane of the upper edge of the flange 74 during one-half of its operating cycle, as shown by dotted lines in Fig. 4, and will fall below the plane of the upper edge of the flange 74 during the other half of the operating cycle of the pitman arm, as shown by dotted lines in Fig. 3.

Preferably, and as illustrated herein, the pitman arm or member 33 is in the nature of a relatively thin blade whereby to present a relatively narrow upper surface with closely spaced relatively sharp edges for maximum cutting efficiency on the cuttings. While the upper edge of this blade-like pitman may be sharpened in the manner of a knife blade, I prefer to grind or file the upper surface to provide closely spaced sharp parallel upper edges. Also, I have found that the efficiency of the machine in parting cuttings overlying the pitman arm and frame tongue 4 can be further greatly enhanced by forming the upper surface of the pitman arm to provide a series of teeth 75. In the form of the invention of Figs. 1 to 8, I provide similar teeth 76 in the elongated reciprocating slide member 38. As illustrated, those teeth 75 of the pitman arm 33 laterally adjacent the frame flange 74 project largely or entirely above the plane of the upper surface of the flange 74 during part of the operating cycle and are retracted largely or completely below the plane of the upper surface of the flange 74 during another part of the operating cycle of the pitman arm 33 (see for example dotted lines in Figs. 3 and 4). Since the rear end of the pitman arm 33 is operated by the crank 32, all portions of the elongated pitman arm 33 rearwardly of the pivot 37 will partake of compound forward and rearward and upward and downward reciprocatory or oscillatory motion, whereas the extreme front end of the pitman arm 33 at the pivot point 37 and the slide member 38 will partake of straight line generally forward and rearward reciprocatory or oscillatory motion. Hence, it may be properly said that the pitman arm is reciprocated generally forwardly and rearwardly of the machine, or generally upwardly and downwardly.

Preferably, and as an important feature of the invention, the direction of rotation of the pitman operating crank 32 is clockwise with respect to Figs. 3 and 4 and counterclockwise with respect to Fig. 1, so that the elongated pitman arm or member 33, or at least all points thereon rearwardly of the axis of the pivot 37, move upwardly during their initial rearward reciprocating movements. Due to this important feature, the pitman arm tends to produce a rearward feeding action on overlying cuttings, which further increases the efficiency of the pitman arm or member 33 in its important function of separating the overlying cuttings adjacent the transverse center of the machine. In order to further facilitate this rearward feeding action of cuttings by the reciprocating arm or member 33, the front edges or faces of the teeth 75 of the reciprocating pitman arm or member 33 are preferably given a relatively high angle of rake, whereas the rear edges or faces thereof are given a relatively very low angle of rake. For the purpose hereof, a plane perpendicular to the plane of the upper ends of the several teeth 75 is considered to represent a zero angle of rake. By this standard, it will be obvious from the drawings that the rear faces of the teeth 75, as illustrated, have approximately a zero angle of rake, whereas the front faces of the said teeth 75 have a relatively very high angle of rake.

The teeth 76 of the slide 38 of Figs. 1 to 8, inclusive, are preferably shaped approximately as are the teeth 75 of the pitman arm or member 33 and these, even though reciprocating forwardly and rearwardly in a straight line, do, nevertheless, aid materially in parting the cuttings and cooperate with the toothed pitman arm or member 33 to this end. Furthermore, because these teeth 76 also have a high angle of rake on their leading faces and a relatively low angle of rake on their rear faces, they will also tend to produce a rearward feeding action of the cuttings even though they be reciprocated back and forth in a straight line.

Preferably, and as herein illustrated, the elongated reciprocating member 33 is in the nature of a pitman arm forming part of the drive for the cutting mechanism, and my arrangement, whereby this member 33 serves this dual function, is considered in itself to be an important contribution to the art. However, it should be appreciated that, insofar as the broader aspects of my invention are concerned, the reciprocating element 33 may be independent of the drive for the cutting mechanism. Of course, the object of providing the teeth 76 on the reciprocating slide 38 is to start the parting action on the cuttings as closely as possible to the cutting mechanism.

*Operation, Figs. 1 to 8, inclusive, and 12*

When the engine 23 is operated, the crank 32 will be rotated through the transmission mechanism described in a counterclockwise direction with respect to Figs. 3 and 4, and motion of the crank will be transmitted to the slide 38 through the pitman arm 33. The slide will now reciprocate rapidly in the guide described in a straight line, substantially at a right angle to the relatively reciprocating bars 5 and 6, this reciprocating motion of the slide 38 being, in turn, transmitted to the sickle bar 6 by the flexible band members 45 and 46 operating about the arcuate face of member 44, which, member 44, will oscillate about its axis. Of course, the flexible band member 45 pulls the sickle bar 6 in one direction and the flexible band member 46 pulls the sickle bar in the opposite direction.

Now, if the machine be forwardly advanced through long grass, weeds, standing grain or the like, either by self-propulsion through its engine 23 or by power of the operator applied through the handles 71, or otherwise, the cutting mechanism comprising the finger bar 5 and sickle bar 6 will cut a swathe or path through the said grass, weeds, standing grain or the like of greater width than the space between the outsides of the ground wheels 1. If the cuttings are long or are matted, they will tend to hang up on those portions of the machine following the cutting mechanism. In the present machine, however, such cuttings will overly and be contacted progressively by the teeth 76 of the reciprocating slide 38, and the teeth 75 of the reciprocating pitman arm-acting member 33 will progressively act thereon to part the same, so that the parting action on the cuttings will be progressive from a point immediately rearwardly of the cutting mechanism to the vertical plane of the front portions of the ground wheels 1. In some instances, the parting action on the cuttings will be quite thoroughly accomplished before such cuttings as overly the slide 38 and pitman arm 33 work as far back as the vertical plane of the fronts of the ground wheels, but in the case of very long, and particularly in the case of matted grass cuttings and the like, the parting operation may be incomplete at the time the cuttings reach the plane of the fronts of the ground wheels 1. In the latter cases, which are, in fact, quite common, unparted cuttings overlying the reciprocating toothed pitman arm member 33 and spanning the space between the ground wheels 1, will be engaged by the ground wheels 1 which will drag the engaged portions downwardly and anchor the same while the reciprocating toothed pitman arm member 33 completes its severing or parting action on the cuttings. From this it will be seen that, in the arrangement described, the ground wheels 1 cooperate with the reciprocating pitman arm member 33 in parting the cuttings to permit free passage of those portions of the machine lying rearwardly of the ground wheels, in the following manner, to wit:

(a) As the cuttings overlying the reciprocating pitman arm member 33 and spanning the space between the ground wheels 1 become engaged by the front portions of the ground wheels 1, rearward movement of the cuttings as a mass over the machine will be stopped at points of engagement with the wheels 1, while the tendency of the toothed pitman arm 33 to impart a step of rearward movement to the cuttings during each rearward and upward movement thereof will be continued and will now tend to rip and cut at the overlying cuttings with increased efficiency.

(b) As the cuttings are engaged by the wheels 1, they will be drawn down toward the ground by the ground wheels. This will, in turn, draw the cuttings taut over the reciprocating pitman arm member 33 to increase the efficiency of the hacking and cutting action of the said reciprocating pitman arm member 33 on the cuttings, and, of course, the upward and downward reciprocating motion of the pitman arm member 33, as well as forward and rearward movements thereof, is highly important.

(c) Finally, the cuttings will be dragged down to the ground and anchored under the ground wheels while the hacking and cutting action of the toothed reciprocating pitman arm member 33 thereon completes the parting operation. In practice, it has been found that the machine illustrated very efficiently and completely parts cuttings of all nature and prevents accumulation of cuttings on the machine and entanglement of the machine in cuttings under any and all conditions. As an aid to the dragging down of cuttings by the ground wheels 1 when working in cooperation with the reciprocating toothed pitman arm 33 and slide 38, I preferably employ traction type tires on the wheels 1 and which may advantageously be formed by transverse grooves or notches 1a in the ground engaging tread surfaces of the tires 1b.

*Details of Figs. 9 and 10, not previously described*

In the form of the invention shown in Figs. 9 and 10, the teeth on the slide element 38 have been omitted and as a substitute therefor, the reciprocating toothed pitman arm member 33 has been extended forwardly of the pivotal connection 37 between the member 33 and the slide 38, as shown in Figs. 9 and 10, to a point close to the rear portion of the finger bar 7 of the cutting mechanism, this forwardly extended portion of the pitman arm member 33 being indicated by 33a. The extended portion 33a of the pitman arm works in laterally outwardly spaced parallel relation to the slide 38 and the teeth thereof are preferably identical to the teeth of that portion of the pitman arm 33 of Figs. 9 and 10 lying rearwardly of the pivot 37. The toothed forwardly projecting portion 33a of the pitman arm 33 of Figs. 9 and 10 serves very much the same function as do the teeth 76 of the slide 38 in previous figures. However, the efficiency of parting action on cuttings of the toothed forwardly projecting portion 33a of the pitman arm 33 of Figs. 9 and 10 is somewhat greater than that of the toothed slide 38 of previous figures, due to the fact that the said forwardly projected portion 33a of the pitman arm 33 of Figs. 9 and 10 combines upward and downward oscillatory motion with forward and rearward oscillatory motion. Otherwise, however, the operation of the structure of Figs. 9 and 10 will be substantially identical to that of the device of Figs. 1 to 8, inclusive, and 12.

While I have herein described several embodiments which my invention may assume in practice, it will, of course, be understood that the same is capable of further modification without departing from the spirit and scope of the invention as expressed in the following claims.

What I claim is:

1. In a mowing machine of the class described, a wheel supported frame having a forwardly projecting portion, elongated cutting mechanism extending generally transversely of the direction of travel of the machine and mounted intermediate its ends on the said forwardly projecting portion of the frame, an elongated slide mounted for forward and rearward reciprocation on the forwardly projecting portion of the frame in closely rearwardly spaced relation to the cutting mechanism, a pitman arm pivoted to said slide on a generally horizontal axis and extending rearwardly therefrom, a power driven crank journalled on the frame on a generally horizontal axis and to the throw of which the rear end portion of the pitman arm is journalled, said crank imparting rotary motion in a generally vertical plane to the portion of the pitman journalled thereto, power transmission mechanism operatively connecting said slide to the cutting mechanism, the upper surface of said pitman arm being toothed and being exposed to cuttings and serving to part the latter.

2. The structure defined in claim 1 in which the elongated slide extends forwardly of its point of pivotal connection of the front end portion of the pitman arm and is toothed in the manner of the pitman arm.

3. The structure defined in claim 1 in which the pitman arm extends forwardly of its point of pivotal connection with the slide and in which said forwardly extending portion of the pitman arm is also toothed.

4. In a mowing machine of the class described, an elongated cutting mechanism extending generally transversely of the direction of travel of the machine, and mechanism for driving the cutting mechanism, the last said mechanism comprising a power-driven crank journalled to the machine on a generally horizontal axis extending transversely of the machine and located rearwardly of the cutting mechanism, an elongated pitman arm having its rear end portion journalled on said crank for rotary motion in a substantially vertical plane extending forwardly and rearwardly of the machine, said pitman arm extending generally forwardly and downwardly from said crank to a point forwardly of the ground wheels and in the vicinity of the transverse center of the elongated cutting mechanism, means mounting and guiding the front end portion of the pitman arm for reciprocating movements under the action of the crank, and power transmission mechanism interposed between the extended front end portion of the pitman arm and the cutting mechanism, the upper surface of the pitman arm being exposed to cuttings and being toothed.

5. The structure defined in claim 4 in which the rear faces of the teeth of the pitman arm have a relatively low angle of rake and the front faces thereof have a relatively high angle of rake, whereby cuttings coming in contact with the teeth will be fed rearwardly over the pitman arm, the direction of rotation of the crank being such that the toothed pitman arm will move upwardly during its initial rearward movements.

6. In a mowing machine of the class described, a mobile frame structure, an elongated cutting mechanism extending generally transversely of the direction of travel of the machine and mounted intermediate its ends on said frame structure, mechanism for driving the cutting mechanism, the last said mechanism comprising a power-driven crank journalled to the machine on a generally horizontal axis extending transversely of the machine and located rearwardly of the cutting mechanism, an elongated pitman arm having its rear end portion journalled on said crank for rotary motion in a substantially vertical plane extending forwardly and rearwardly of the machine, said pitman arm extending generally forwardly and downwardly from said crank to the vicinity of the transverse center of the elongated cutting mechanism, means mounting and guiding the front end portion of the pitman arm for reciprocating movements under the action of the crank, and power transmission mechanism interposed between the extended front end portion of the pitman arm and the cutting mechanism, the upper surface of the pitman arm being exposed to cuttings and being toothed, and the frame structure carrying a forwardly and rearwardly elongated part extending in close laterally-spaced parallel relation to the longitudinally-intermediate portion of the pitman arm, the upper surface of the pitman arm moving alternately above and below the plane of the upper surface of said frame part under rotation of the crank, whereby to clear the pitman arm teeth of cuttings.

7. The structure defined in claim 6 in which the rear faces of the teeth of the pitman arm have a relatively low angle of rake and the front faces thereof have a relatively high angle of rake, and the direction of rotation of the crank being such that the toothed pitman arm will move upwardly during its initial rearward movements, whereby cuttings coming in contact with the teeth will be fed rearwardly over the pitman arm.

8. In a mowing machine of the class described, ground wheels, a frame structure mounted on the ground wheels, elongated transversely extending cutting mechanism mounted intermediate its ends on said frame structure, said cutting mechanism being located forwardly of one of said wheels and extending laterally beyond the vertical plane of the outside of said wheel, driving mechanism for the cutting mechanism, the last said mechanism comprising a power-driven crank located rearwardly of the cutting mechanism and the front of said wheel, means journalling the crank to the frame structure on a substantially horizontal axis extending transversely of the machine, an elongated pitman arm having its rear end portion journalled on said crank for rotary motion in a substantially vertical plane and extending forwardly and rearwardly of the machine, said pitman arm being located in laterally-spaced relation to said wheel and extending generally forwardly and downwardly from behind the plane of the front of said ground wheel to a point forwardly thereof and in the vicinity of the transversely intermediate portion of the cutting mechanism, means mounting and guiding the front end portion of the pitman arm for reciprocating movements under the action of the crank, and power transmission mechanism interposed between the extended front end portion of the pitman arm and the cutting mechanism, the upper surface of said pitman arm being exposed to cuttings, and said ground wheel serving to drag down and anchor cuttings overlying the pitman arm so that the latter will be effectively parted by the action of the toothed pitman arm thereon.

9. The structure defined in claim 8 in which the said pitman arm is toothed.

10. The structure defined in claim 8 in which the upper surface of the pitman arm is toothed, and in which the frame structure carries a forwardly and rearwardly extending elongated portion disposed in closely spaced parallel relation to the intermediate portion of the pitman arm, the toothed upper surface of the pitman arm projecting alternately above and below the plane of the upper surface of said frame portion under the action of the crank, whereby the said frame portion will serve to clear the teeth of cuttings.

11. In a mowing machine of the class described, axially spaced ground wheels, a frame structure mounted between the laterally-spaced ground wheels and having a tongue portion projecting forwardly from between the ground wheels to a point forwardly of the ground wheels, said frame tongue being located in the vicinity of the transverse center of the machine, transversely extending reciprocating cutting mechanism mounted at its transversely intermediate portion on the front end of said tongue portion and extending laterally outwardly of the vertical planes of the outer sides of the ground wheels, driving mechanism for reciprocating the cutting mechanism, the last said mechanism comprising a power-driven crank located and working between the ground wheels and journalled on the frame structure on a substantially horizontal axis extending transversely of the machine, an elongated pitman arm having its rear end portion journalled on said crank for rotary motion in a substantially vertical plane extending forwardly and rearwardly of the machine, said pitman arm being located in the vicinity of the transverse center of the machine and extending generally forwardly and downwardly from between the ground wheels to a point forwardly of the ground wheels and in the vicinity of the transverse center of the cutting mechanism, means mounting and guiding the front end portion of the pitman arm for reciprocating movements under the action of said crank, and power transmission mechanism interposed between the extended front end portion of the pitman arm and the reciprocating cutting mechanism, the upper surface of the pitman arm being exposed to cuttings, the laterally-spaced ground wheels serving to drag down and anchor cuttings overlying the toothed pitman arm so that the latter will be effectively parted by the action of the toothed pitman arm thereon.

12. The structure defined in claim 11 in which the upper surface of the pitman arm is toothed.

JACOB A. RONNING.

REFERENCES CITED

The following references are of record in the file of this patent:

UNITED STATES PATENTS

| Number | Name | Date |
|---|---|---|
| 1,567,013 | Rutishauser | Dec. 22, 1925 |
| 2,195,518 | Johnson | Apr. 2, 1940 |
| 2,335,541 | Ronning | Nov. 30, 1943 |
| 2,448,078 | Brown | Aug. 31, 1948 |

FOREIGN PATENTS

| Number | Country | Date |
|---|---|---|
| 18,124 1904 | Great Britain | Aug. 22, 1905 |